United States Patent [19]

Ewen

[11] 3,723,663

[45] Mar. 27, 1973

[54] BATTERY FEED AND RING TRIP RELAY CIRCUIT

[76] Inventor: Joel J. Ewen, 35-51 87th Street, New York, N.Y. 11372

[22] Filed: Sept. 24, 1971

[21] Appl. No.: 183,533

[52] U.S. Cl. ....................179/84 R

[51] Int. Cl. ....................H04m 1/00

[58] Field of Search ....................179/84 R, 81 R, 18 F

[56] References Cited

UNITED STATES PATENTS

| | | | |
|---|---|---|---|
| 2,848,553 | 8/1958 | Adenstedt | 179/84 R |
| 3,591,728 | 7/1971 | Birck | 179/84 R |
| 3,436,488 | 4/1969 | Barbato | 179/84 R |
| 3,529,098 | 9/1970 | Chapman | 179/19 |
| 2,232,181 | 2/1941 | McClew | 179/7.1 |
| 1,864,955 | 6/1932 | Stokely | 179/16 F |

*Primary Examiner*—Ralph D. Blakeslee
*Attorney*—Michael Ebert

[57] ABSTRACT

A battery feed and ring trip relay circuit for a telephone system is disclosed in which "tripping" of the ringing signal is accomplished using only the battery feed and relay. The battery feed relay includes a holding coil, normally open relay contacts in the energizing circuit for the holding coil, and contacts for deenergizing the ringing relay. The ringing relay includes normally open contacts in the energizing circuit for the holding coil of the battery feed relay. These ringing relay contacts open when the ringing relay is deenergized by the battery feed relay after the battery feed relay contacts in the energizing circuit for the holding coil are closed.

3 Claims, 1 Drawing Figure

PATENTED MAR 27 1973
3,723,663
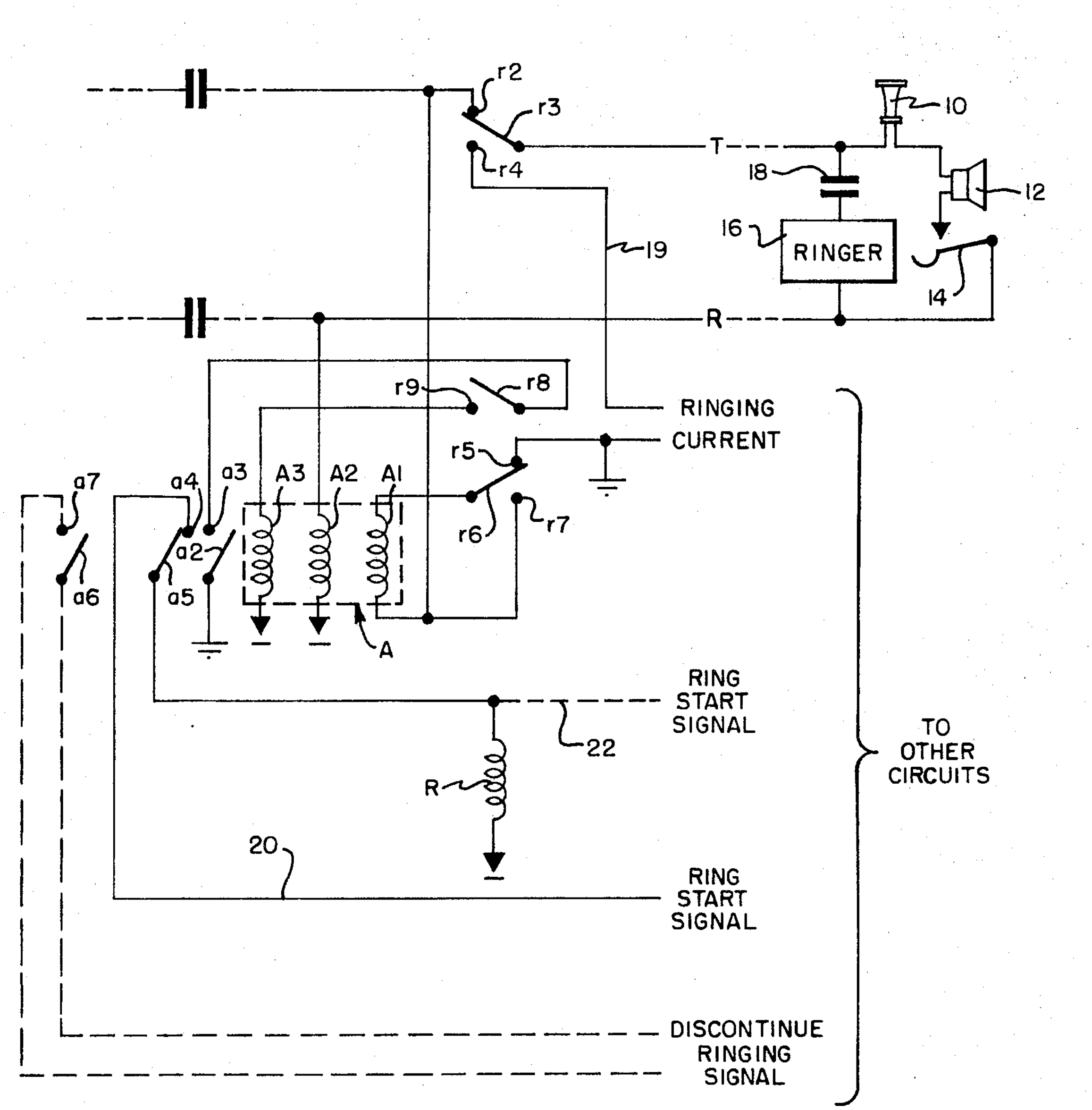
INVENTOR.
JOEL J. EWEN

BATTERY FEED AND RING TRIP RELAY CIRCUIT

The present invention relates to telephone systems and, in particular, to the battery feed and ringing circuit of a called party or switchboard wherein a ringing signal must be tripped when the called party answers.

In conventional two wire telephone systems, battery (negative) voltage is connected to one of the wires (normally designated the R wire) and ground (positive) voltage is connected to the other wire (normally designated as the T wire). When the line is "seized" by lifting the telephone handset (for example), a resistive connection is made between the T and R wires to energize a battery feed relay which indicates, through suitable contacts, that the line is "requesting" service.

Conventionally, on an incoming call to the telephone apparatus, a ringing relay is energized. This relay, through its contacts, disconnects one wire of the line from the battery feed relay and connects that wire to a source of ringing current. The ringing current activates a call signal until the subscriber answers or the apparatus is seized to provide a loop closure. Conventionally, a separate ring trip relay responsive to the loop current is energized in order to de-energize the ringing relay and to reconnect the telephone line through the battery feed relay to signal that a call has been answered.

The present invention provides a battery feed and ring trip relay circuit in which all of the foregoing functions are provided by the battery feed relay in conjunction with the ringing relay, thus obviating the need for a separate ring trip relay (and possibly a further helper relay) to perform these functions. The circuit, according to the invention, results in an economic benefit as compared to existing circuits for accomplishing the same function without any sacrifice as to reliability and performance.

Briefly, in accordance with the invention, the battery feed relay includes suitable contacts for de-energizing the ringing relay. Additionally, it includes a holding coil which includes in its energizing circuit normally open contacts of both the battery feed relay and the ringing relay. When the called telephone is answered, the battery feed relay is energized by one of its other coils through the ringing circuit to close the energizing circuit for the holding coil. The ringing relay contacts in the energizing circuit for the holding coil are of the last-to-open type so that the battery feed relay is maintained energized while the line connected to the source of ringing current is returned to the ground or battery wire as the case may be.

The invention is described in further detail below with reference to the drawing which is a circuit diagram of a preferred embodiment of the invention.

Referring to the drawing, a telephone apparatus is diagrammatically shown as comprising a microphone (or transmitter) 10, receiver 12 and a hook switch 14 which, conventionally, is closed when the handset is removed from its cradle. The ground and battery lines to the telephone system are shown at T and R, respectively. The call circuit is shown as including a ringer 16 and capacitor 18 connected as a series branch across the telephone set. The battery feed relay is shown as relay A including three separate coils A1, A2 and A3. Coils A1 and A2 are the usual balanced coils of conventional battery feed relays while coil A3, according to the invention, serves as a holding coil. The ringing relay is shown as relay R.

Except as described in the following, the operation of the system including the battery feed and ringing relays is standard. Thus, to simplify the description of the invention, the standard battery feed and ringing relay circuits have not been illustrated. In the following description, relay contacts operated by the ringing relay R are designated by the letter *r* followed by a numeral. Contacts operated by the battery feed relay A are designated by the letter *a* and a corresponding numeral. All relay contacts are illustrated in the condition they are in when their associated relay coils are de-energized.

The ringing relay R includes a first set of relay contacts *r*2, *r*3, and *r*4. This set of contacts is adapted to open the ground or T telephone line when the ringing relay R is energized and to connect the T line to a source of ringing current appearing on line 19. A second set of ringing relay contacts *r*5, *r*6, and *r*7 disconnects one side of the battery feed relay coil A1 from ground and creates a short circuit around the coil which functions as an anti-chattering circuit as described below. The third set of ringing relay contacts *r*8 and *r*9 is connected in the energizing circuit for the holding coil A3 of the battery feed relay.

The coil A2 of the battery feed relay is connected between the negative source and battery line R. This results in energization of the battery feed relay A when the telephone is answered (i.e. switch 14 is closed). One end of coil A3, which operates as a holding coil, is connected to the negative source and the other end of coil A3 is connected through normally open contacts *r*8, *r*9 of relay R and normally open contacts *a*2, *a*3 of the battery feed relay A to ground. A second set of battery feed relay contacts *a*4, *a*5 is connected in the energizing circuit for the ringing relay R in order to de-energize the ringing relay immediately upon seizure of the line. If desired, additional contacts *a*6 and *a*7 may be provided to transmit a signal to other equipment which, in turn, will de-energize relay R when desired in lieu of contacts *a*4, *a*5. The operation of the circuit is as follows.

When the circuit is idle, that is, no conversation is in progress and the connected party or equipment is not being rung, ground appears on the T wire via battery feed coil A1 and ringing relay contacts *r*6 and *r*5. No current flows in the circuit because the switch 14 is open.

If the telephone apparatus seizes the line (by closure of switch 14 when the handset is lifted), a resistive connection exists between the lines T and R through the microphone 10 and receiver 12. This causes current to flow in the coils A1 and A2 of battery feed relay A to energize the relay. Battery feed relay A then provides suitable signals through contacts (not shown) to indicate that the line is in use. In conventional fashion, the current flowing in the loop provides the transmitter current and interruptions of such current by a dial provide the dialing signals to be transmitted through the system. Battery feed relay coils A1 and A2 are normally of equal resistance and turns so that the telephone line is balanced against interference from outside potentials.

When the call is complete, opening of switch 14 (when the handset is replaced in its cradle) opens the loop to de-energize the battery feed relay A which then signals that the call has terminated and the line is free.

When it is desired to call the subscriber, the ringing relay R is energized by standard equipment (not shown). For example, relay R may be energized by the presence of a signal on lines 20 or 22. The ring-start signal on line 20 is coupled through the normally closed battery feed contacts *a*4 and *a*5 to the relay R. When relay R is energized, ringing relay contacts *r*8 and *r*9 are closed to enable the energizing circuit for the holding coil A3 of relay A. Contact *r*3 transfers to contact *r*4 to open the T line to the telephone set and connect it instead to the source of ringing current on line 19. The ringing current is an alternating current which is not blocked by capacitor 18 and, therefore, is coupled across coil A2 of battery feed relay A. (The direct current path through the telephone set remains open by virtue of switch 14.)

Although the alternating ringing current will not energize the battery feed relay A, it can cause "chattering" of the relay contacts. To prevent this, the battery feed coil A1 is short-circuited by transfer of the ringing relay contact *r*6 to contact *r*7. The short circuit, in a known way, prevents the relay contacts from chattering.

When the call is answered, switch 14 is closed to complete a direct current path between the lines T and R. This energizes battery feed relay coil A2 through the telephone set, relay contacts *r*3, *r*4, and the ringing circuit (line 19) to ground. When relay A is energized, contacts *a*4 and *a*5 (or *a*6 and *a*7) open the energizing circuit for ringing relay R while contacts 2*a* and 3*a* complete the energizing circuit for the holding coil A3 of relay A.

When the ringing relay R is de-energized, its contacts return to the illustrated condition in which the battery feed relay A is maintained energized by the above-described direct current path through coils A1 and A2. According to the invention, contact *r*8 does not return to its illustrated condition until after the contacts *r*6 and *r*3 have been restored to ensure that the battery feed relay A will be maintained energized during this transitional period. Similarly, relay contact *r*8 must not be restored to its illustrated condition until battery feed relay contacts *a*2 and *a*3 have been closed. The techniques required to ensure this relationship are well known.

Obviously, the invention is not limited to any particular environment. It may be used in trunk circuits, link circuits, intraoffice trunk circuits, adapter circuits, interface circuits of telephone exchanges, private branch exchanges, private telephone systems, intercommunication systems, telephone equipment located on customer premises, and, generally, in any type of telephone system where battery and ground must be fed to a telephone line and a ringing signal tripped by seizure of a line to provide a loop closure either directly or through other apparatus. The additional functions provided by the battery feed and ringing relays are not material to the invention which would also have utility where helper relays are provided for these relays. The polarity of the illustrated circuit has been selected only for purposes of explanation and also is not material to the invention. The anti-chattering effect provided by the short circuit across battery feed coil 1 through ringing relay contacts *r*6 and *r*7 may be provided by the use of capacitors or diodes or other elements appropriately connected by means of suitable ringing relay contacts.

What is claimed is:

1. In a battery feed and ring trip arrangement for a telephone system provided with a battery feed relay, a ringing relay and energizing circuits therefor, wherein:

A. said battery feed relay includes a holding coil, an operating coil, a first set of contacts which is normally open and is connected in the energizing circuit for said holding coil whereby when said battery feed relay is energized by current fed to said operating coil, said first set of contacts closes to maintain this relay in the energized state, and a second set of contacts connected in the energizing circuit for said ringing relay whereby when the battery feed relay is energized, said second set of contacts operates to de-energize the ringing relay; and B. said ringing relay includes one set of contacts which is normally open and is interposed in the energizing circuit of said holding coil whereby when said ringing relay is energized, the one set of ringing relay contacts is caused to close to permit energization of said holding coil upon closure of said first set of battery feed relay contacts, the one set of ringing relay contacts being adapted to reopen when the ringing relay is de-energized upon the energization of the battery feed relay, but only after another set of ringing relay contacts functions to re-energize the operating coil of the battery feed relay prior to de-energization of the holding coil.

2. A battery feed and ring trip circuit according to claim 1, further including a normally open anti-chattering circuit associated with said battery feed relay, said ringing relay including contacts for closing said anti-chattering circuit when said ringing relay is energized.

3. A battery feed and ring trip circuit for use with a telephone system having ground and battery lines and a telephone apparatus, comprising a ringing relay having at least three sets of contacts, a battery feed relay having at least one holding coil, two additional coils and two sets of contacts, the first set of said ringing relay contacts adapted to connect a source of ringing current to one of said lines and to simultaneously open said one line, the second set of ringing relay contacts normally connecting one side of the first battery feed relay coil in its energizing circuit, and adapted to close an anti-chattering circuit across said first coil when the ringing relay is energized, the third set of ringing relay contacts being normally open and connected in series in the energizing circuit for said holding coil, the said additional coils of said battery feed relay being connected in an energizing circuit including said first and second sets of ringing relay contacts when the ringing relay is de-energized and said telephone apparatus, the first set of battery feed relay contacts being normally open and connected in series with the said energizing circuit for said holding coil, the second set of battery feed relay contacts adapted to de-energize said ringing relay, at least one of said additional battery feed relay coils being connected in an energizing circuit including said telephone apparatus and said source of ringing current when said ringing relay is energized, the third set of ringing relay contacts returning to its normal condition after said first and third sets of ringing relay contacts and after said first set of battery feed relay contacts has changed condition.

* * * * *